United States Patent
Salter et al.

(10) Patent No.: US 9,975,475 B1
(45) Date of Patent: May 22, 2018

(54) NOTIFICATION DEVICE FOR VEHICLE

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/359,710

(22) Filed: Nov. 23, 2016

(51) Int. Cl.
*B60Q 1/14* (2006.01)
*B60Q 1/26* (2006.01)
*B60Q 1/44* (2006.01)
*H05B 37/02* (2006.01)
*B60Q 1/30* (2006.01)
*B60Q 1/34* (2006.01)
*B60T 7/12* (2006.01)
*B62D 15/02* (2006.01)

(52) U.S. Cl.
CPC ............. *B60Q 1/44* (2013.01); *B60Q 1/30* (2013.01); *B60Q 1/34* (2013.01); *B60T 7/12* (2013.01); *B62D 15/02* (2013.01); *H05B 37/0227* (2013.01); *B60Q 2400/20* (2013.01)

(58) Field of Classification Search
CPC ... B60Q 1/44; B60Q 1/30; B60Q 1/34; B60Q 2400/20; B60T 7/12; B62D 15/02; H05B 37/0227
USPC .............................................. 315/77, 80, 81
See application file for complete search history.

(56) References Cited

U.S. PATENT DOCUMENTS

| 4,403,210 | A | 9/1983 | Sullivan |
| 5,345,218 | A | 9/1994 | Woods et al. |
| 5,838,259 | A * | 11/1998 | Tonkin ................... B60Q 1/444 340/464 |
| 6,111,500 | A | 8/2000 | Wilson |
| 6,299,337 | B1 | 10/2001 | Bachl et al. |
| 6,371,637 | B1 | 4/2002 | Atchinson et al. |
| 9,090,203 | B2 | 7/2015 | Seifert |
| 9,333,906 | B2 | 5/2016 | Barton et al. |
| 2006/0214781 | A1 | 9/2006 | Terzian |
| 2014/0301101 | A1 | 10/2014 | Russ |
| 2014/0309806 | A1 * | 10/2014 | Ricci ........................ B60Q 1/00 701/1 |
| 2014/0309856 | A1 * | 10/2014 | Willson-Quayle ..... B60Q 1/444 701/36 |
| 2016/0090033 | A1 | 3/2016 | Bravo Solis et al. |

FOREIGN PATENT DOCUMENTS

CN 204956271 U 1/2016
DE 202005007501 U1 9/2005

* cited by examiner

*Primary Examiner* — Daniel D Chang
(74) *Attorney, Agent, or Firm* — Jason Rogers; Price Heneveld LLP

(57) ABSTRACT

A vehicle lighting device is disclosed. The device comprises a plurality of light sources configured to selectively emit a first light color and a second light color and a controller. The controller is configured to receive a driver assist signal and a brake signal. In response to the brake signal, the controller is configured to activate the first light color constantly. In response to a combination of the brake signal and the driver assist signal, the controller is configured to activate the first light color constantly and the second light color periodically.

15 Claims, 4 Drawing Sheets

NOTIFICATION DEVICE FOR VEHICLE

FIELD OF THE INVENTION

The present disclosure generally relates to a vehicle indicator device and more particularly relates to a lighting device configured to output a notification.

BACKGROUND OF THE INVENTION

Advanced driver assistance systems (ADAS) are becoming increasingly prevalent in automotive vehicles. Such systems may provide for assistance to a driver of a vehicle in various forms. Some ADAS systems may even provide for active correction in the form of steering or brake assist to further improve the operation of a vehicle. In various embodiments, the disclosure may provide for a vehicle lighting device or system that may be used with ADAS systems.

SUMMARY OF THE INVENTION

According to one aspect of the present disclosure, a vehicle lighting device is disclosed. The device comprises a plurality of light sources configured to selectively emit a first light color and a second light color and a controller. The controller is configured to receive a driver assist signal and a brake signal. In response to the brake signal, the controller is configured to activate the first light color constantly. In response to a combination of the brake signal and the driver assist signal, the controller is configured to activate the first light color constantly and the second light color periodically.

According to another aspect of the present disclosure, a method for controlling a vehicle lighting device is disclosed. The method comprises receiving a driver assist signal and receiving a brake signal. The method may continue by emitting a first light color in response to the brake signal. Additionally, the method may provide for emitting the first light color constantly and a second light color periodically at a first frequency in response to a combination of the brake signal and the driver assist signal.

According to yet another aspect of the present disclosure, a vehicle lighting device is disclosed. The device comprises a plurality of light sources configured to selectively emit a first light color and a second light color and a controller. The controller is configured to receive a driver assist signal from an automated driver assistance system, a brake signal from a brake sensor, and a vehicle status signal from a vehicle control module. The controller is configured to activate the first light color constantly in response to the brake signal. The controller is further configured to activate the first light color constantly and the second light color at a first frequency in response to a combination of the brake signal and the driver assist signal. The controller is further configured to activate the first light color at a second frequency and the second light color at the first frequency in response to the vehicle status signal.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
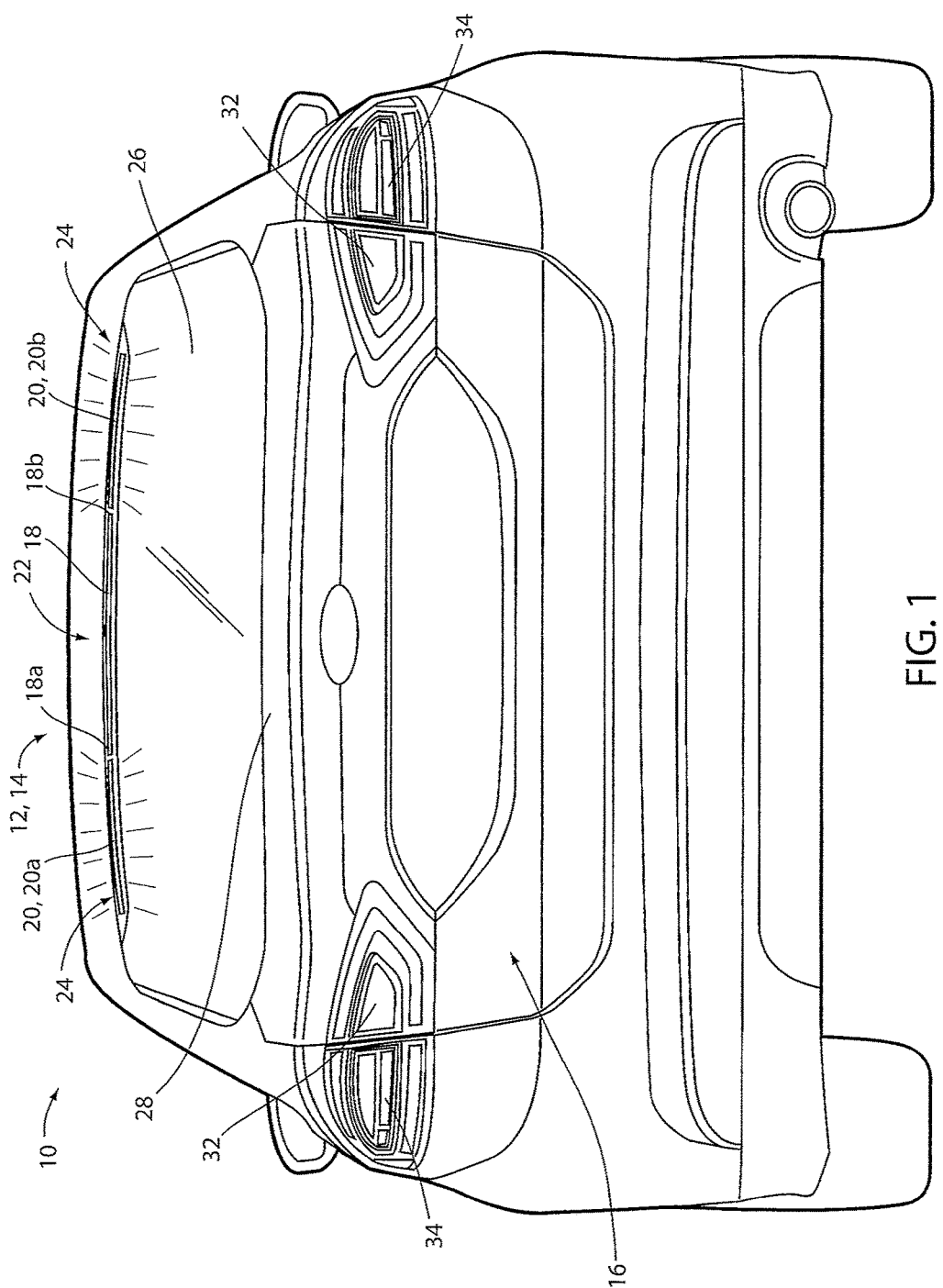
FIG. 1 is a projected view of a rear portion of a vehicle demonstrating a lighting device.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a vehicle comprising a lighting system 12. The lighting system 12 may be in communication with a vehicle control module and one or more driver assistance systems (DAS). In this configuration, the lighting system 12 may be operable to activate a visible indication demonstrating that the vehicle 10 is responding a to a driver assist signal from the driver assistance system. The visible indication may be emitted via a light module 14. The light module may be configured to direct light in a rearward direction from a rearward directed portion 16 of the vehicle 10. Though discussed in particular reference to rearward directed portion 16 of the vehicle 10, the lighting system 12 may similarly be utilized on various portions of the vehicle 10.

The light module 14 may comprise a first light source 18 and a second light source 20. The second light source 20 may comprise two segments extending laterally from proximate a first side 18a and a second side 18b of the first light source 18. The second light source 20 may comprise a first segment 20a and a second segment 20b. The first segment 20a may be disposed proximate a first side 18a of the first light source 18. The second segment 20b may be disposed proximate a second side 18b of the first light source 18. In this configuration, each of the light segments 20a and 20b may extend along a roof line portion of the vehicle 10 above a rear windshield. Accordingly, the second light source 20 may comprise a plurality of light emitting segments disposed on opposing sides of the first light source 18. Though demonstrated above the rear windshield in the exemplary embodiment, the light module may me located on various portions of the vehicle 10.

Each of the light sources 18 and 20 of the light module 14 may comprise at least one light emitting device configured to emit light energy from the vehicle 10. In general, the light emitting devices of each of the light sources 18 and 20 may correspond to any suitable light emitting device. For example, the light emitting devices of the light sources 18 and 20 may correspond to light emitting diodes (LEDs), incandescent, fluorescent, halogen, or various other forms of light emitting devices. Each of the light sources 18 and 20 may further be operable to emit a distinct color of light. For example, the first light source 18 may be configured to emit a first light color 22 and the second light source 20 may be configured to emit a second light color 24. The light from each of the light sources 18 and 20 may be transmitted through one or more lenses of the light module 14 to control the first light color 22 and the second light color 24. In some embodiments, the light emitting devices of each of the light sources 18 and 20 may be tinted or otherwise configured to emit the first light color 22 and the second light color 24, respectively.

In various embodiments, the light module 14 may be disposed proximate a rear windshield 26 (e.g. above, below, etc.), a rear spoiler 28, or various rearward directed portions 16 of the vehicle 10. In this configuration, the lighting system 12 may be configured to output various indications to identify a driver assist operation or various additional operating conditions of the vehicle 10. In some embodiments, each of the various indications may comprise one or more unique characteristics. For example, in some embodiments, a controller of the system 12 may be operable to selectively activate each of the light sources 18 and light segments 20*a* and 20*b* to illuminate at one or more frequencies of periodic illumination. In this way, each of the frequencies may characterize and visually communicate a status of the vehicle indicating an operating condition or combination of operating conditions.

In some embodiments, the light module 14 may include the first light source 18 and the segments 20*a* and 20*b* of the second light source 20 incorporated in a multi-element lighting apparatus. In such embodiments, each of the first light source 18 and the second light source 20 may be combined as attached assemblies or integrated assemblies sharing one or more features or connections with the vehicle 10. For example, in some embodiments, the light module 14 may be incorporated on a rear spoiler 26, bumper, deck-lid, rear hatch, body panel, or various rearward directed portions 16 of the vehicle 10. In this way, the light module 14 and various light modules discussed herein may be incorporated on the vehicle 10 in various locations.

For example, in response to a manual or operator initiated brake input, the controller may activate the first light source 18 to steadily emit the first light color 22. Additionally, the controller may identify a condition wherein the brake input is detected and a driver assistance system is activated to assist in operation of the vehicle 10. In response to the combined input of the manual brake input and a signal from the driver assistance system, the controller may activate the first light source 18 to periodically illuminate at a first frequency and the second light source 20 to periodically illuminate at a second frequency. In this way, the controller may activate the light sources 18 and/or 20 to notify a nearby vehicle of a specific operating condition of the vehicle 10. Additional examples of operating conditions and characteristic or identifying illumination schemes for the first light source 18 and/or the second light source 20 are discussed in reference to FIG. 3.

As discussed herein, the frequencies (e.g. first, second, etc.) may correspond to visible illumination variations from the light sources 18 and/or 20 with frequencies below a flicker fusion threshold. For example, the frequencies may be in a range of less than 20 Hz, and in an exemplary embodiment may range from 0 Hz to 10 Hz. In this way, the frequency of each of the light colors from the light sources 18 and 20 may be readily perceptible such that the frequency characteristics of the light sources may provide a visual indication of a control state of the vehicle 10. Such a control states may correspond to manual controls by a vehicle operator, automated controls via a driver assistance system, and combinations of such controls.

The vehicle 10 may further comprise additional lighting devices that may function independently or in combination with the light module 14. For example, the vehicle 10 may comprise a plurality of taillights 32 and a plurality of turn indicators 34. The taillights 32 may be configured to function as one or both or running lights and brake lights. In some embodiments, the light module 14 may further be configured to control the taillights 32 and/or turn indicators 34 to further provide an indication of an operation of a driver assistance system. For example in some embodiments, the controller may be configured to control the tail light 32 to illuminate synchronized with the first light source 18. Additionally, the controller may be configured to control the turn indicator 34 to illuminate synchronized with the second light source 20.

Figure 2:
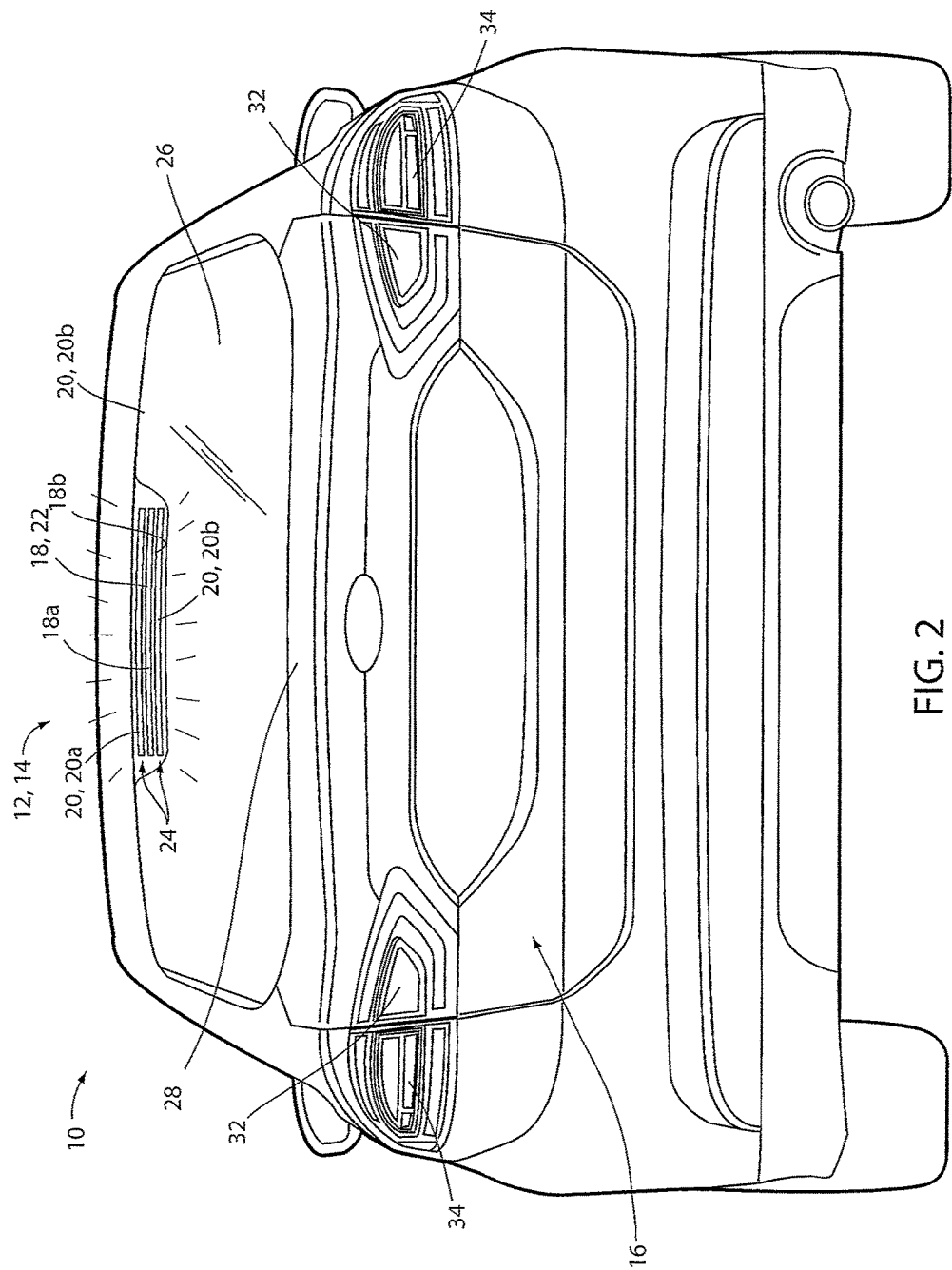
FIG. 2 is a rear projected view of a vehicle demonstrating a lighting device.

Referring to FIG. 2, in some embodiments, the lighting system 12 may comprise a light module 44. The light module 44 may comprise various elements similar to the light module 14. Accordingly, like elements may be described utilizing like reference numerals for clarity. Though discussed in reference to the specific exemplary embodiments shown in the attached figures, the lighting system 12 may be configured for a variety of applications without departing from the spirit of the disclosure.

The light module 44 may comprise a first light source 18 and a second light source 20. The second light source 20 may comprise a first segment 20*a* and a second segment 20*b* disposed on opposing sides of the first light source 18. In some embodiments, the first segment 20*a* may be located above the first light source 18. The second segment 20*b* may be located below the first light source 18. In this configuration, the light module 44 may be located centrally on a rearward directed portion 16 of the vehicle 10 to emit the first light color 22 from the first light source 18 and the second light color 24 from the second light source 20.

Though shown located on the rear windshield 26, the light module 44 may be incorporated on a rear spoiler 26, bumper, deck-lid, rear hatch, body panel, or various rearward directed portions 16 of the vehicle 10. In such configurations, the light module 44 may correspond to a centrally located indicator light configured to output a notification, which may correspond to a brake signal, a driver assist signal and/or a variety of signals to communicate operation of the vehicle 10. In this way, the lighting modules as described herein may be configured to communicate valuable operating information to indicate operating characteristics of the vehicle 10, control inputs of a driver assistance system of the vehicle 10, and manual inputs from an operator of the vehicle 10.

As discussed herein, the first light source 18 may be configured to emit the first light color 22, and the second light source 20 may be configured to emit the second light color 24. The first light color 22 may correspond to a red color. In this way, the first light source 18 may be configured to emit a brake light indication in the red color as typically required by law for operation on public motor ways. The second light source 20 may be configured to emit the second light color 24 as a yellow or orange color. The second light color 24 may accordingly mimic a typical color that may be utilized for a hazard lighting indication or turn indication.

Though discussed in reference to particular colors, the first light color 22 and the second light color 24 may correspond to a wide variety of colors. Accordingly, the specific embodiments of the disclosure are intended to provide exemplary implementations and therefore should not be considered limiting to the scope of the disclosure.

Figure 3:
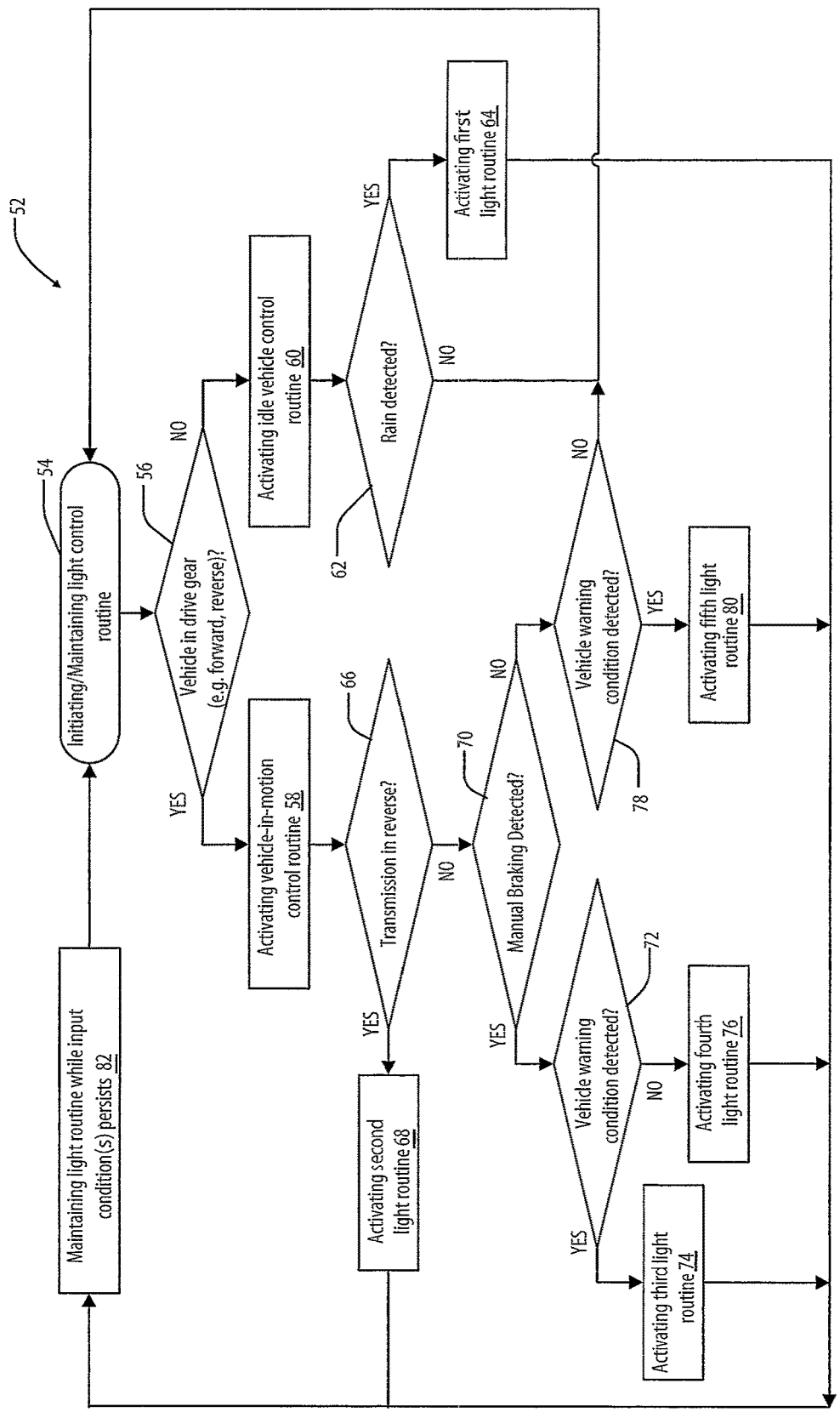
FIG. 3 is a flow chart of a light control routine for a lighting device.

Referring now to FIG. 3, a flow chart demonstrating a method 52 for a light control routine of the lighting system 12 is shown. Beginning at step 54, the light control routine for the lighting system 12 may be initiated upon activation or ignition of the vehicle 10. The various steps of the method 52 may completed by a controller, which is further discussed in reference to FIG. 4. Once initiated, the controller may detect if the vehicle 10 is configured in a driving gear via a transmission sensor (56). Based on the detection indicating the transmission of the vehicle 10 in a driving gear, the controller may selectively activate a vehicle-in-motion control routine 58 or an idle vehicle control routine 60.

The idle vehicle control routine 60 may be activated by the controller in response to the vehicle ignition being active, the vehicle transmission being in a parked condition and an indication of rain detection in step 62. If rain is detected in step 62, the controller may activate a first light routine (64). The first light routine 64 may correspond to the selective activation of at least one of the first light source 18 and the second light source 20. For example, the first light routine 64 may comprise activating the first light source 18 to emit the first light color 22 at a first frequency and the second light source 20 to emit the second light color 24 at a second frequency. In this way, the controller may control the light module 14 to output an indication comprising the first light color 22 at the first frequency and second light color 24 at the second frequency to alert an approaching vehicle that the vehicle 10 is in a parked condition with an active ignition during a rainy condition.

As further discussed herein, each of the operating frequencies (e.g. the first frequency, the second frequency, etc.) may correspond to different operating frequencies that may be characteristic of a specific vehicle operating condition. Accordingly, the terms first, second, third, etc. may be utilized to indicate specific light routines and frequencies for the light sources 18 and 20 that may differ among the operating states of the vehicle 10 as discussed. Accordingly, the identifiers (e.g. first, second, etc.) may be utilized to clearly indicate each of a variety of exemplary light routines that may be utilized alone or in combination. Therefore, the light routines discussed herein shall be considered as exemplary control schemes that may be utilized in various combinations to suit particular applications. Therefore, the routines shall not be considered to limit the disclosure to any specific number of light routines or frequencies.

Returning to step 56, in response to identifying the vehicle 10 in a drive gear, the controller may activate the vehicle-in-motion control routine 58. The vehicle-in-motion control routine 58 may first determine if the transmission is in reverse (66). If the controller identifies that the transmission is in reverse, the controller may activate a second lighting routine (68). In the second lighting routine 68, the controller may selectively activate the first light source 18 at a third frequency and the second light source 20 at a fourth frequency. As previously noted, each of the frequencies described herein may correspond to similar or differing frequencies as desired to suit a specific application. Accordingly, the third frequency may be similar to the first frequency as described in reference to the first light routine 64 in some embodiments and may differ in others.

If in step 66, the controller identifies that the transmission is not in reverse, the controller may continue to detect whether a manual braking input is detected (70). If the manual braking is detected 70, the controller may continue to detect whether a vehicle warning condition or driver assist signal is detected in step 72. The vehicle warning condition or driver assist signal may be communicated to the controller in response to the activation of the driver assistance system. If the vehicle warning condition is detected, the controller may activate a third lighting routine (74). If the controller does not detect the warning condition in step 72, the controller may activate a fourth light routine (76). In response to the third light routine 74, the controller may selectively activate the first light source 18 to illuminate at a fifth frequency and the second light source 20 to illuminate at a sixth frequency. In response to the fourth light routine 76, the controller may activate the first light source 18 to a seventh frequency and the second light source 20 to an eighth frequency. In this configuration, the lighting system 12 may be configured to activate the third light routine 74 when the vehicle 10 is braking and a vehicle warning condition is detected. Additionally, the controller may be configured to activate the fourth light routine 76 in response to detecting the manual braking and when a vehicle warning condition is not detected. Such an advanced operating configuration may provide for the lighting system 12 to output specific lighting routines to indicate a variety of manual driving operations that may be activated by a vehicle operator and a variety of conditions that may be automatically activated by a driver assistance system as described herein.

Returning to step 70, if the controller does not detect a manual braking, the method 52 may continue to identify whether a vehicle warning condition or driver assist signal is detected in step 78. If the controller identifies the vehicle warning condition or driver assist signal in step 78, the controller may activate a fifth light routine (80). In the fifth light routine 80, the controller may selectively activate the first light source 18 at a ninth frequency and the second light source 20 at a tenth frequency. In this configuration, the lighting system 12 may control the first light source 18 and the second light source 20 to output a visual indication that a vehicle warning condition or driver assist signal has been detected but no manual braking has been initiated by an operator of the vehicle 10. Accordingly, the fifth light routine 80 may be activated in response to an automated braking condition activated by a driver assistance system.

Following the activation of each of the first light routine 64, the second light routine 68, the third light routine 74, the fourth light routine 76, or the fifth light routine 80, the controller may maintain the light routine while the input conditions for the specific light routine persist (82). The method 52 may provide for a specific or characteristic output from the light module 14 or 44 based on a variety of operating states of a vehicle 10. In some embodiments, one or more of the frequencies may correspond to a fixed illumination of the first light source 18 or the second light source 20. Additionally, one or more of the frequencies (e.g. first, second, third, etc.) may be the same or similar depending on a desired configuration. Accordingly, the lighting system 12 may provide for flexible operation that may be configured to suit a variety of applications.

Figure 4:
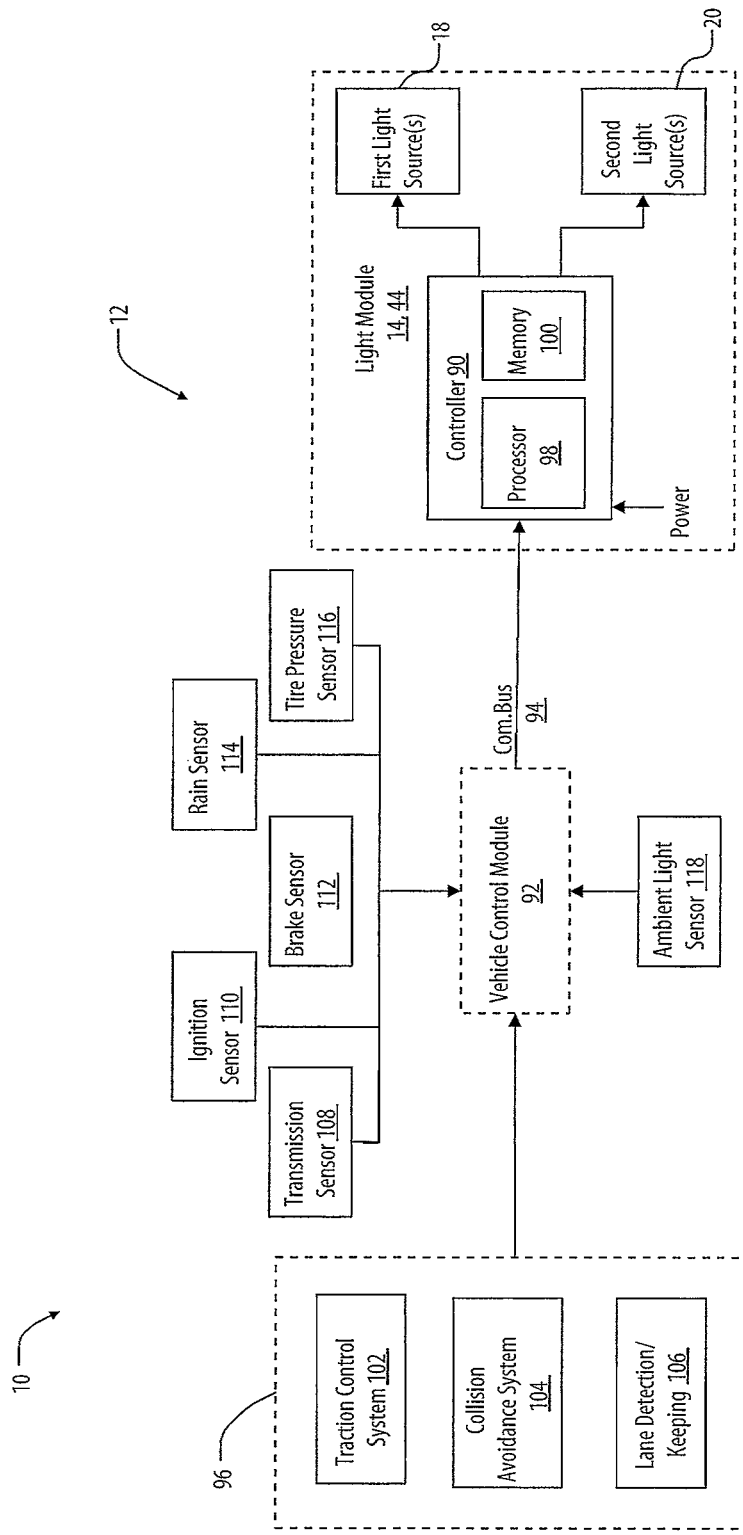
FIG. 4 is a block diagram of a lighting system for a vehicle in accordance with the disclosure.

Referring now to FIG. 4, a block diagram of the lighting system 12 incorporated in the vehicle system 10 is shown. The lighting system 12 may comprise a controller 90 configured to selectively activate the first light source 18 and the second light source 20. The controller 90 may be in communication with the vehicle 10 via a vehicle control module 92 and a communication bus 94. In this configuration, the controller 90 may receive signals from a variety of vehicle systems, which may include a driver assistance system 96. The controller 90 may comprise a processor 98, which may be in communication with a memory 100. In this configuration, the controller 90 may be configured to receive operating and/or status signals from various systems of the vehicle 10 and selectively activate one or more of the light sources 18 and 20 as discussed herein.

The driver assistance system 96 may include one or more of a traction control system 102, a collision avoidance system 104, a lane departure detection system 106, and/or various forms of driver assistance systems. The traction control system 102 may be in communication with an ABS sensor which may provide traction feedback from one or more drive wheels of the vehicle 10. The collision avoidance system 104 may be in communication with one or more sensors configured to detect objects proximate the vehicle 10. The lane detection system 106 may comprise an imager module configured to detect variations in an operating surface on which the vehicle 10 is driving. Though each of the driver assistance systems 96 discussed herein is described in reference to particular sensory devices, it shall be understood that the lighting system 12 may be configured to operate with a variety of driver assistance systems.

The controller 90 may further be in communication with a transmission gear sensor 108, a vehicle ignition sensor 110, a brake sensor 112, a rain sensor 114, and/or a tire pressure sensor 116. Each of the sensors 108-116 may be in communication with the controller 90 via the communication bus 94. In some embodiments, on or more of the ignition sensor 110, the tire pressure sensor 116, and the vehicle control module 92 may be configured to detect and communicate a vehicle failure signal to the controller 90. For example, the control module 92 may be configured to communicate the vehicle failure signal to the controller 90 in response to an ignition failure detected by the ignition sensor 110 and/or a rapid pressure loss detected by the tire pressure sensor 116. In this way, the controller 90 may be configured to receive various status signals identifying operating conditions of the vehicle 10. Additionally, the system 12 may be in communication with an ambient light sensor 118. In response to an ambient light signal, the controller 90 may adjust an intensity of the light emitted from the light modules 14 and 44. The controller 90 may be configured in a variety of ways to support the various functions of the lighting system 12 as discussed herein.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle lighting device comprising:
   a plurality of exterior light sources configured to selectively emit a first light color and a second light color; and
   a controller configured to receive a driver assist signal indicating an automated vehicle control operation, a brake signal, and configured to:
      activate the first light color in response to the brake signal;
      activate the first light color constantly and the second light color periodically at a first frequency in response to a combination of the brake signal and the driver assist signal; and
      activate the second light color at a second frequency in response to a vehicle failure signal.

2. The lighting device according to claim 1, wherein the plurality of light sources correspond to a first light source and a second light source.

3. The lighting device according to claim 2, wherein the second light source comprises two segments extending along opposing sides of the first light source.

4. The lighting device according to claim 3, wherein a first segment of the second light source extends laterally from a first side of the first light source and a second segment of the second light source extends laterally from a second side of the first light source.

5. The lighting device according to claim 1, wherein the vehicle failure signal comprises a failure signal from a vehicle ignition sensor.

6. The lighting device according to claim 1, wherein the vehicle failure signal is in response to a notification of a rapid tire pressure change from a tire pressure sensor.

7. The lighting device according to claim 1, wherein the driver assist signal is received from a driver assistance system in response to an activation of an automated driver assistance function of the vehicle.

8. The lighting device according to claim 7, wherein the automated driver assistance function comprises an automatic braking operation.

9. The lighting device according to claim 7, wherein the automated driver assistance function comprises an automatic steering operation.

10. A method for controlling an exterior vehicle lighting device comprising:
  receiving a driver assist signal indicating an automated vehicle control operation;
  receiving a brake signal;
  emitting a first light color in response to the brake signal;
  emitting the first light color constantly and a second light color periodically at a first frequency in response to a combination of the brake signal and the driver assist signal; and
  emitting the first light color at a second frequency and the second light color at a third frequency in response to a vehicle failure signal.

11. The method according to claim 10, wherein the vehicle failure signal indicates at least one of a critical tire pressure change and an engine failure.

12. The method according to claim 10, further comprising detecting a rain signal, a parked gear selection, and a vehicle ignition signal.

13. The method according to claim 12, further comprising emitting the first light color at a fourth frequency and the second light color at a fifth frequency in response to receiving the rain signal, the parked gear selection, and the vehicle ignition signal being active.

14. An exterior vehicle lighting device comprising:
  a plurality of light sources configured to selectively emit a first light color and a second light color; and
  a controller configured to receive a driver assist signal from an automated driver assistance system indicating an automated vehicle control operation and a brake signal from a brake sensor, the controller configured to:
    activate the first light color constantly in response to the brake signal;
    activate the first light color constantly and the second light color at a first frequency in response to the brake signal and the driver assist signal; and
    activate the first light color at a second frequency and the second light color at a first frequency in response to the driver assist signal without the brake signal.

15. The device according to claim 14, wherein the driver assist signal is received in response to an automated braking or steering function of a driver assistance system of the vehicle.

\* \* \* \* \*